US011323998B2

(12) United States Patent
Cierny et al.

(10) Patent No.: US 11,323,998 B2
(45) Date of Patent: May 3, 2022

(54) HIDDEN NODE DETECTION IN LTE LICENSED ASSISTED ACCESS

(71) Applicant: Nokia Solutions and Networks Oy, Espoo (FI)

(72) Inventors: Michal Cierny, Helsinki (FI); Timo Erkki Lunttila, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 74 days.

(21) Appl. No.: 15/532,209

(22) PCT Filed: Dec. 3, 2014

(86) PCT No.: PCT/EP2014/076409
§ 371 (c)(1),
(2) Date: Jun. 1, 2017

(87) PCT Pub. No.: WO2016/086985
PCT Pub. Date: Jun. 9, 2016

(65) Prior Publication Data
US 2017/0339693 A1    Nov. 23, 2017

(51) Int. Cl.
*H04W 72/04* (2009.01)
*H04W 16/14* (2009.01)
(Continued)

(52) U.S. Cl.
CPC ....... *H04W 72/0446* (2013.01); *H04W 16/14* (2013.01); *H04W 24/10* (2013.01);
(Continued)

(58) Field of Classification Search
CPC ........... H04W 72/0446; H04W 74/006; H04W 16/14; H04W 24/10; H04W 84/042; H04W 84/12
See application file for complete search history.

(56) References Cited

U.S. PATENT DOCUMENTS

2015/0139175 A1    5/2015 Ratasuk et al.
2015/0172950 A1*   6/2015 Chen ................. H04W 16/14
                                                    370/252
(Continued)

FOREIGN PATENT DOCUMENTS

CN    101711037 A    5/2010
CN    102045745 A    5/2011
(Continued)

OTHER PUBLICATIONS

Office action received for corresponding European Patent Application No. 14806627.7, dated Sep. 28, 2017, 3 pages.
(Continued)

Primary Examiner — Jackie Zuniga Abad
(74) Attorney, Agent, or Firm — Squire Patton Boggs (US) LLP

(57) ABSTRACT

The application relates to improved hidden node detection for Long Term Evolution LTE Licensed-Assisted Access LAA. Channel State Information CSI measurements can be seen as one existing solution that could be used for obtaining information about the existence of a hidden node. However, relying on CSI reporting alone is rather unreliable. One of the reasons for this is that the CSI measurements and reporting do not take into account the regulatory requirements such as LBT. A further possible way to detect hidden nodes is to perform LBT (clear channel assessment CCA) at the transmitter (e.g. eNB) and receiver (e.g. UE) at the same time. However, there is still the need for an improved solution for how to detect hidden nodes preventing LTE LAA uplink operation and complicating coexistence. These problems are solved by ensuring that interference from non-hidden nodes (such as WLAN node 1 in FIG. 1) is not measured. Therefore the serving eNB detects a free channel during LBT procedure, i.e. that non-hidden nodes are not transmitting, and informs the UE which performs the hidden
(Continued)

node detection measurements, by downlink scheduling, whether the serving eNB is active in the current subframe. The UE then performs the measurements only in subframes of the channel occupied by the serving eNB. Thereby, the UE only captures interference coming from hidden nodes.

16 Claims, 6 Drawing Sheets

(51) Int. Cl.
    *H04W 24/10*     (2009.01)
    *H04W 74/00*     (2009.01)
    *H04W 84/04*     (2009.01)
    *H04W 84/12*     (2009.01)

(52) U.S. Cl.
    CPC ........ *H04W 74/006* (2013.01); *H04W 84/042* (2013.01); *H04W 84/12* (2013.01)

(56) References Cited

U.S. PATENT DOCUMENTS

| | | | |
|---|---|---|---|
| 2016/0050667 A1* | 2/2016 | Papasakellariou | H04L 1/1822 370/329 |
| 2016/0135148 A1* | 5/2016 | Novlan | H04L 1/00 370/329 |

FOREIGN PATENT DOCUMENTS

| | | |
|---|---|---|
| CN | 103249166 A | 8/2013 |
| CN | 104754601 A | 7/2015 |
| JP | 2013-229798 A | 11/2013 |
| WO | 2013167748 A1 | 11/2013 |
| WO | 2016/072468 A1 | 5/2016 |

OTHER PUBLICATIONS

Office action received for corresponding Korean Patent Application No. 2017-7018090, dated Jan. 17, 2018, 4 pages of office action and no page of translation available.
"Study on Licensed-Assisted Access using LTE", 3GPP TSG RAN Meeting #65, RP-141646, Agenda: 14.1.1, Ericsson, Sep. 9-12, 2014, 8 Pages.
"Avoiding Hidden Node Problem by Pseudo Signalling From eNB Perspective", 3GPP TSG-RAN WG1 Meeting #79, R1-145127, Agenda: 6.3.2.2, Institute for Information Industry (III), Nov. 17-21, 2014, pp. 1-2.
"Avoiding Hidden Node Problem by Full-duplex Radio From UE Perspective", 3GPP TSG-RAN WG1 Meeting #79, R1-145128, Agenda: 6.3.2 2, Institute for Information Industry (III), Nov. 17-21, 2014, pp. 1-3.
Rahman et al., "Hidden Problems With The Hidden Node Problem", 23rd Biennial Symposium on Communications, May 30-Jun. 1, 2006, pp. 270-273.
"Broadband Radio Access Networks (BRAN);5 GHz high performance RLAN; Harmonized EN covering the essential requirements of article 3.2 of the R&TTE Directive", Draft ETSI EN 301 893, V1.7.2, Jul. 2014, pp. 1-95.
International Search Report and Written Opinion received for corresponding Patent Cooperation Treaty Application No. PCT/EP2014/076409 dated Aug. 17, 2017, 15 pages.
KYOCERA: "Further considerations on the essential functionalities for LAA", 3GPP Draft; RI-144955, 3rd Generation Partnership Project (3GPP), Mobile Competence Centre ; 650, Route Des Lucioles ; F-G6921 Sophia-Antipolis Cedex ; France vol. RAN WG1, No. San Francisco, USA; Nov. 17-Nov. 21, 2014 Nov. 17, 2014 (Nov. 17, 2014), XP0508951G8.
Alcatel-Lucent Shanghai Bell et al.: "Hidden node problem and potential solutions for LAA", 3GPP Draft; RI-144703—Hidden Node—Final, 3rd Generation Partnership Project (3GPP), Mobile Competence Centre ; 650, Route Des Lucioles ; F-06921 Sophia-Antipolis Cedex ; France vol. RAN WG1, No. San Francisco, USA; Nov. 17-Nov. 21, 2014 Nov. 17, 2014 (Nov. 17, 2014), XP050895086.
Huawei et al.: "Further analysis on the required functionalities for LAA", 3GPP Draft; RI-144590, 3rd Generation Partnership Project (3GPP), Mobile Competence Centre ; 650, Route Des Lucioles ; F-06921 Sophia-Antipolis Cedex ; France vol. RAN WG1, No. San Francisco, USA Nov. 17-Nov. 21, 2014 Nov. 17, 2014 (Nov. 17, 2014), XP050875680.
ZTE: "Analysis of LAA UL enhancement", 3GPP Draft; RI-144830 Analysis of LAA UL Enhancement V2, 3rd Generation Partnership Project (3GPP), Mobile Competence Centre ; 650, Route Des Lucioles ; F-06921 Sophia-Antipolis Cedex ; France vol. RAN WG1, No. San Francisco, USA Nov. 17-Nov. 21, 2014 Nov. 8, 2014 (Nov. 8, 2014), XP050885502.
NVIDIA: "Initial RAN2 Impact Analysis for LTE LAA", 3GPP Draft; R2-150434_ Initial RAN2 Impact Analysis for LTE LAA, 3rd Generation Partnership Project (3GPP), Mobile Competence Centre ; 650, Route Des Lucioles ; F-06921 Sophia-Antipolis Cedex ; France vol. RAN WG2, No. Athens, Greece; Feb. 9-Feb. 13, 2015 Feb. 8, 2015 (Feb. 8, 2015), XP050935704.
Office action received for corresponding European Patent Application No. 14806627.7, dated Mar. 16, 2018, 6 pages.
Office action received for corresponding Japanese Patent Application No. 2017-529829, dated Jul. 31, 2018, 2 pages of office action and 4 page of translation available.
Philippine Substantive Examination Report Application Type/No. Invention 1/2017/501027 dated Apr. 22, 2019.
Philippines Office Action corresponding to Philippines Appln. No. 1-2017-501027, dated Aug. 7, 2019.
Chinese Office Action corresponding to CN Appln. No. 201480082923.4, dated Sep. 2, 2019.
Philippines Subsequent Substantive Examination Report corresponding to PH Appln. No 1-2017-501027, dated Aug. 7, 2019.
Philippines Subsequent Substantive Examination Report corresponding to PH Appln. No 1-2017-501027, dated Oct. 8, 2019.
Jul. 22, 2020 Substantive Examination Report Stage 1 issued in Indonesian Patent Application No. PID201702321 with English translation.
Philippines Office Action corresponding to PH Appln. No. 1/2017/501027, dated Feb. 28, 2020.

* cited by examiner

HIDDEN NODE DETECTION IN LTE LICENSED ASSISTED ACCESS

RELATED APPLICATION

This application was originally filed as Patent Cooperation Treaty Application No. PCT/EP2014/076409 filed Dec. 3, 2014

FIELD OF THE INVENTION

The present invention generally relates to wired and wireless communication networks, and more specifically relates to a method, apparatus and computer program product for enabling improved hidden node detection for Long Term Evolution LTE Licensed-Assisted Access LAA.

BACKGROUND

Mobile data transmission and data services are constantly making progress, wherein such services provide various communication services, such as voice, video, packet data, messaging, broadcast, etc. In recent years, Long Term Evolution LTE™ has been specified, which uses the Evolved Universal Terrestrial Radio Access Network E-UTRAN as radio communication architecture according to 3GPP specification.

The present specification focuses on LTE operation on unlicensed spectrum LTE-U, which is also referred to as Licensed-Assisted Access LAA. Thereby, special emphasis is put on the detection of hidden network nodes, such as typically WiFi Access Points APs, in a scenario where LTE LAA and WiFi nodes are deployed in the same unlicensed carrier.

In the 3GPP study item RP-141646, Licensed-Assisted Access using LTE was approved. Nevertheless, in some regions in the world, unlicensed technologies need to abide to certain regulations, e.g. Listen-Before-Talk LBT in order to provide fair coexistence between LTE and other technologies, such as WLAN, and in future possibly also between LTE operators.

As regards the above-mentioned LBT, according to LTE-U, before being permitted to transmit, a user or an access point, such as an eNodeB, may, depending on the regulatory requirements, need to monitor the given radio frequency for a short period of time to ensure the spectrum is not already occupied by some other transmission. This requirement is referred to as Listen-before-talk LBT.

In regard of LAA, it is desired to find a single global solution which enhances LTE to enable licensed-assisted access to unlicensed spectrum while coexisting with other technologies and fulfilling the regulatory requirements. Single global solution means that LTE LAA must fulfill the combined requirements of all regulatory bodies.

According to the above-mentioned 3GPP specification (study item) RP-141646, some guidance on feasible solutions are provided. That is, the identified enhancements should reuse the features of LTE as much as possible. Further, both single and multi-operator scenarios shall be covered, including the case where multiple operators deploy LTE in the same unlicensed spectrum bands. Finally, high priority should be put on the completion of the DL only scenario.

A key assumption in LTE LAA is that stand-alone operation using unlicensed carrier only is precluded. Carrier aggregation between primary cell PCell on a licensed band and one or more secondary cells SCells on unlicensed band is always assumed.

Channel State Information CSI measurements can be seen as one existing solution that could be used for obtaining information about the existence of a hidden node. However, relying on CSI reporting alone is rather unreliable. One of the reasons for this is that the CSI measurements and reporting do not take into account the regulatory requirements such as LBT.

A further possible way to detect hidden nodes is to perform LBT (clear channel assessment CCA) at the transmitter (e.g. eNB) and receiver (e.g. UE) at the same time. That is, if the eNB and UE both detect a busy channel, there is probably no hidden node. Further, if the eNB detects a free channel but the UE detects a busy channel, there is a hidden node. The case when an eNB detects a busy channel and the UE detects free channel is not of particular interest. However, while it would be theoretically possible to create a measurement procedure where eNB and UE perform LBT at the same time, the specification impact may be large.

However, there is still the need for an improved solution for how to detect hidden nodes preventing LTE LAA uplink operation and complicating coexistence.

SUMMARY OF THE INVENTION

Therefore, in order to overcome the drawbacks of the prior art, it is an object underlying the present invention to provide novel solutions to the Hidden node detection problem taking the special characteristics of LTE LAA into account.

In particular, it is an object of the present invention to provide a method, apparatus and computer program product for enabling improved hidden node detection for LTE Licensed-Assisted Access.

According to a first aspect of the present invention, there is provided a method, performed by a user equipment, for detecting a hidden node in licensed assisted access, comprising determining resources for hidden node detection measurement, determining, for a subframe in which resources for hidden node detection measurement are located, whether a first serving network element occupies the respective operating channel or not, in case it is determined that the first serving network element is occupying the operating channel, performing hidden node detection measurement in the determined resources, and transmitting the hidden node detection measurement results to a second serving network element.

According to a second aspect of the present invention, there is provided a method, performed by a base station or a network element, for detecting a hidden node in licensed assisted access, comprising determining resources for hidden node detection measurement, transmitting an indication to a user equipment enabling the user equipment to determine, for a subframe in which resources for hidden node detection measurement are located, whether a first serving network element occupies the respective operating channel or not, and in case it is determined that the first serving network element is occupying the operating channel, performing hidden node detection measurement by the user equipment in the determined resources, and receiving the hidden node detection measurement results from the user equipment.

According to a third aspect of the present invention, there is provided an apparatus for use in a user equipment, for detecting a hidden node in licensed assisted access, comprising at least one processor, and at least one memory for storing instructions to be executed by the processor, wherein the at least one memory and the instructions are configured to, with the at least one processor, cause the apparatus at least to perform detecting a hidden node in licensed assisted access, comprising determining resources for hidden node detection measurement, determining, for a subframe in which resources for hidden node detection measurement are located, whether a first serving network element occupies the respective operating channel or not, in case it is determined that the first serving network element is occupying the operating channel, performing hidden node detection measurement in the determined resources, and transmitting the hidden node detection measurement results to a second serving network element.

According to a fourth aspect of the present invention, there is provided an apparatus for use in a base station or a network element, for detecting a hidden node in licensed assisted access, comprising at least one processor, and at least one memory for storing instructions to be executed by the processor, wherein the at least one memory and the instructions are configured to, with the at least one processor, cause the apparatus at least to perform determining resources for hidden node detection measurement, transmitting an indication to a user equipment enabling the user equipment to determine, for a subframe in which resources for hidden node detection measurement are located, whether a first serving network element occupies the respective operating channel or not, and in case it is determined that the first serving network element is occupying the operating channel, performing hidden node detection measurement by the user equipment in the determined resources, and receiving the hidden node detection measurement results from the user equipment.

According to a fifth aspect of the present invention, there is provided a computer program product comprising computer-executable components which, when the program is run, are configured to carry out the method according to the first aspect or the second aspect.

Advantageous further developments or modifications of the aforementioned exemplary aspects of the present invention are set out in the dependent claims.

According to certain embodiments of the present invention, the first serving network element corresponds to a first cell on an unlicensed carrier, and the second serving network element corresponds to a second cell is on a licensed carrier.

According to certain embodiments of the present invention, the first and the second network element are aggregated using carrier aggregation, and the first cell is a secondary cell, and the second cell is a primary cell.

According to certain embodiments of the present invention, when the first serving network element is not occupying the channel, hidden node measurements are not performed or reported.

According to certain embodiments of the present invention, the resources are at least one of time and frequency.

Further, according to certain embodiments of the present invention, the resources are channel state information interference measurement resources and are configured via radio resource control signaling.

Further, according to certain embodiments of the present invention, the resources are unused resource elements located adjacent to at least one of primary synchronization signal and secondary synchronization signal.

Further, according to certain embodiments of the present invention, an indication that the first serving network element occupies the operating channel is that a given subframe or a set of subframes is used for downlink transmission in the licensed assisted access.

Further, according to certain embodiments of the present invention, the first serving network element's channel occupancy is determined based on downlink scheduling, wherein reception of a downlink control information on a physical downlink control channel indicates that the serving network element is occupying the operating channel.

According to certain embodiments of the present invention, the hidden node detection measurement result provides information indicating whether the observed interference exceeds a predetermined threshold or not.

Further, according to certain embodiments of the present invention, the hidden node detection measurement result provides information indicating the observed interference or channel quality level quantized to preset number of bits.

Further, according to certain embodiments of the present invention, the hidden node detection measurement result is periodically reported by physical uplink control channel or physical uplink shared channel resources configured by the second serving network element, or is embedded into periodic or aperiodic channel state information reports. That is, the channel state information report may indicate the existence of hidden nodes.

Further, according to certain embodiments of the present invention, at least one of the received signal strength indicator, the reference signal received power, and reference signal received quality from the configured resources is computed, and the result is reported back to the second serving network element.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Figure 1:
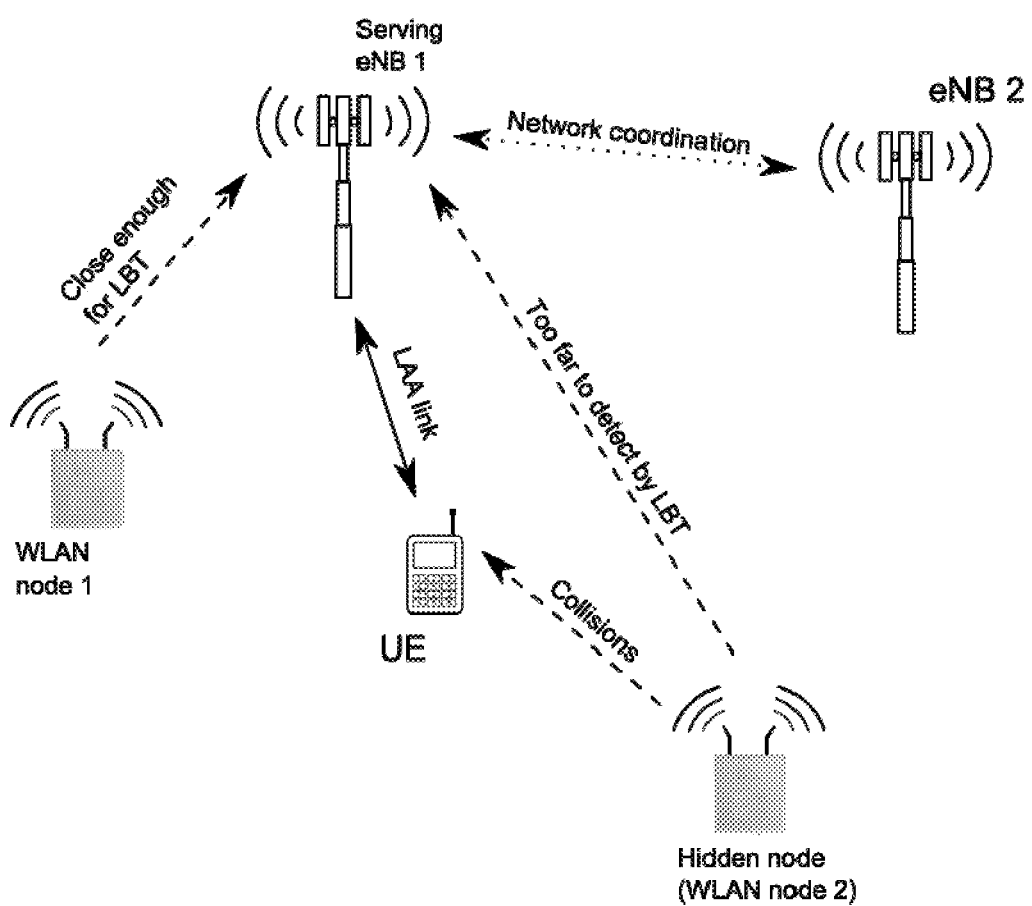
FIG. 1 shows an illustration of the hidden node problem in LTE LAA operation.

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Some example versions of the disclosure and embodiments are described with reference to the drawings. In the following, different exemplifying examples will be described using, as an example of a communication network, a cellular wireless communication network, such as an LTE or LTE-Advanced based system. However, it is to be noted that the present invention is not limited to an application using such types of communication system, but is also applicable in other types of communication systems, be it wireless systems, wired systems or systems using a combination thereof.

Hereinafter, various embodiments and implementations of the present invention and its aspects or embodiments are described using several alternatives. It is generally noted that, according to certain needs and constraints, all of the described alternatives may be provided alone or in any conceivable combination, also including combinations of individual features of the various alternatives.

In particular, the following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

In general, a telecommunication network comprises plural network elements, such as evolved NodeB's (eNB; i.e. base station in LTE environment), user equipments UE (e.g. mobile phone, smart phone, Computer, etc.), controllers, interfaces, etc, and in particular any equipment used in the provision of a telecommunications service.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a base station and a communication network besides those described in detail herein below.

Generally, the hidden node problem as such is well known. An exemplary scenario is depicted in FIG. 1. Two LTE LAA eNodeBs and two WiFi access point are located close to each other. The serving eNodeB eNB1 can "hear" the WLAN node 1 as well as the other LTE LAA eNB1. Therefore the resource sharing among these nodes can simply rely on LBT procedure. Furthermore, if the two LTE eNodeBs (eNB1 & eNB2) are synchronized with each other (e.g. belong to the same operator), some further, more sophisticated interference coordination is possible. As an example, the two LTE synchronized eNodeBs having aligned frame timing may be able to transmit simultaneously even if they can hear each other, provided that their LBT time instances as well as the start of the transmissions is aligned.

However, as presented in FIG. 1, there additionally exists a hidden node, i.e. WiFi AP WLAN node 2, that the serving eNodeB eNB1 cannot hear and is unaware of, but that the UE served by eNB1 can hear. Since the serving eNB1 cannot hear WLAN node 2, it will not impact the outcome of LBT at eNB1 in any way and vice versa, and downlink DL transmissions of eNB1 do not impact the behavior of WLAN node 2. Downlink performance at the UE will be affected, but can in general be handled by regular CSI reporting and link adaptation.

The situation changes when also uplink UL transmissions by the UE are considered. The assumption in the present example is that the UE is located reasonably close to the Hidden Node (i.e. WLAN node 2), and due to LBT procedure, at a given point in time only the UE or the WLAN node 2 can transmit, but not both. This will renders UL operation rather complicated as all the UE's UL transmissions are scheduled by the serving eNB1, which is unaware of the presence of WLAN node 2. The serving eNB1 may see UL grants are not being used, but it will not be able to tell whether this is caused by a node that knows about it (WLAN node 1) or a node that can't "hear" it (WLAN node 2).

Besides, it is to be noted that while FIG. 1 illustrates WLAN nodes as examples, the same effect would be caused by another system that is deployed in the same unlicensed band. That is, WLAN node 1 and WLAN node 2 could also be replaced by LAA eNBs of another operator, assuming networks of different operators are not synchronized. A further issue may be inter-operator synchronization.

The straight forward solution to the problem described above would be to rely on Channel State Information CSI reporting by the UE. CSI comprises e.g. Channel Quality Indicator CQI which essentially represents the modulation and coding scheme/transport block size MCS/TBS of the data that the UE could successfully receives from the eNodeB. In principle, CQI can be considered to represent indirectly also the Signal-to-Interference-plus-Noise Ratio SINR observed at the UE. However, SINR as such is not sufficient for determining whether a hidden node exists or not, or if the UE is able to transmit in the UL or not, i.e. whether the UE sees the channel as occupied or not. This is due to the fact that LBT is determined based on energy detection, i.e. interference measurement. A UE may report a high CQI (and hence observe high SINR) even if the Interference level exceeds a threshold level TL set by regulatory requirements.

As indicated above, yet another problem related to hidden node detection relates to the resources used for the measurement. The measurement should only capture interference coming from hidden nodes, i.e. the nodes not visible to the serving eNodeB. Considering the example in FIG. 1, the measurement for hidden node detection should only capture interference from WLAN node 2, but not WLAN node 1 or eNB2 as LBT procedure (or in the case of LTE eNB2, coordination & alignment of transmissions) should ensure reasonable coexistence.

Accordingly, the present invention provides methodology as well as the related signaling to facilitate efficient hidden node detection in LTE LAA. Hidden node detection can help the network in e.g. determining whether UL operation is possible in the carrier, or if it makes more sense to e.g. perform only DL transmissions.

According to certain exemplary versions of the present invention, firstly, specific (time/frequency) resources are determined for Hidden Node Detection Measurement HNDM (step 1).

Thereby, according to certain embodiments, the resources are preferably CSI interference measurement CSI-IM resources and are configured to the UE via radio resource control RRC signaling (i.e. the zero power CSI reference symbols ZP-CSI-RS resource, periodicity, subframe offset).

Further, the LTE LAA cells (eNodeBs) operating on the same carrier may coordinate the CSI-IM allocation so that each eNodeB assigns the same resources for HNDM. In particular, this should be easy at least among the LTE LAA cells of the same operator having the same PCell.

In another embodiment, the resources are the zero power subcarriers around PSS and SSS signals. These are not as representative in frequency domain as CSI-IM resources, but in case of a synchronized network are present in the same time/frequency location of the transmission of every eNB. This embodiment thus uses predetermined measurement resources and does not need explicit signaling for the purpose.

Then, according to exemplary versions of the present invention, for each subframe for which HNDM resources are configured, the UE determines whether the serving eNodeB/cell has occupied the channel or not (step 2).

This is necessary to ensure that interference from non-hidden nodes (such as WLAN node 1 in FIG. 1) is not measured. When UE determines that the serving eNB is active in the current subframe, it means that the serving eNB has detected a free channel during LBT procedure, i.e. that non-hidden nodes are not transmitting (except possibly LTE LAA nodes synchronized with the serving eNodeB).

As an explicit indication that the serving eNodeB occupies the operating channel, the serving eNodeB (the LTE LAA Scell) or the PCell on the licensed band, it may be explicitly indicated whether a given set of subframes is used for DL transmission by the LTE LAA.

Thereby, the UE may determine the serving eNodeB's channel occupancy e.g. based on DL scheduling. That is, if the UE receives a DL Assignment on the Physical Downlink Control Channel PDCCH, it knows the serving eNodeB is occupying the operating channel.

Thereafter, according to exemplary versions of the present invention, the UE performs HNDM according to the determined resources (i.e. step 1) in case according to step 2, the serving eNodeB is occupying the operating channel (step 3).

Thereby, the measurement may be e.g. 1 bit of information indicating whether the observed interference exceeds a given threshold or not.

Further, the threshold may be e.g. determined based on regulatory requirements, or configured to the UE via RRC signaling. Alternatively, the measurement may indicate the observed interference level quantized to N bits (N>1).

Finally, according to exemplary versions of the present invention, the UE reports the HNDM results to the serving eNodeB (step 4).

According to further exemplary versions of the present invention, HNDM may be reported similarly as CSI reporting.

Further, the eNodeB may e.g. configure separate Physical Uplink Control Channel PUCCH resources for periodic reporting of HNDM results Still further, the reporting may take place on the PCell on the licensed frequency band.

The configuration of the reporting may comprise periodicity, subframe offset, and the PUCCH resource index, such as cyclic shift.

Alternatively, HNDM result may be embedded into periodic or aperiodic CSI reports. For example, HNDM may be reported similarly as RRM measurements. In this option the UE would essentially measure the Received Signal Strength Indicator RSSI from the configured resources and report it back to the serving eNodeB.

Based on the HDMN measurements, the serving eNodeB will get an understanding of the presence of hidden nodes and will be better able to decide whether schedule UL transmission for a given UE or not.

Figure 2:
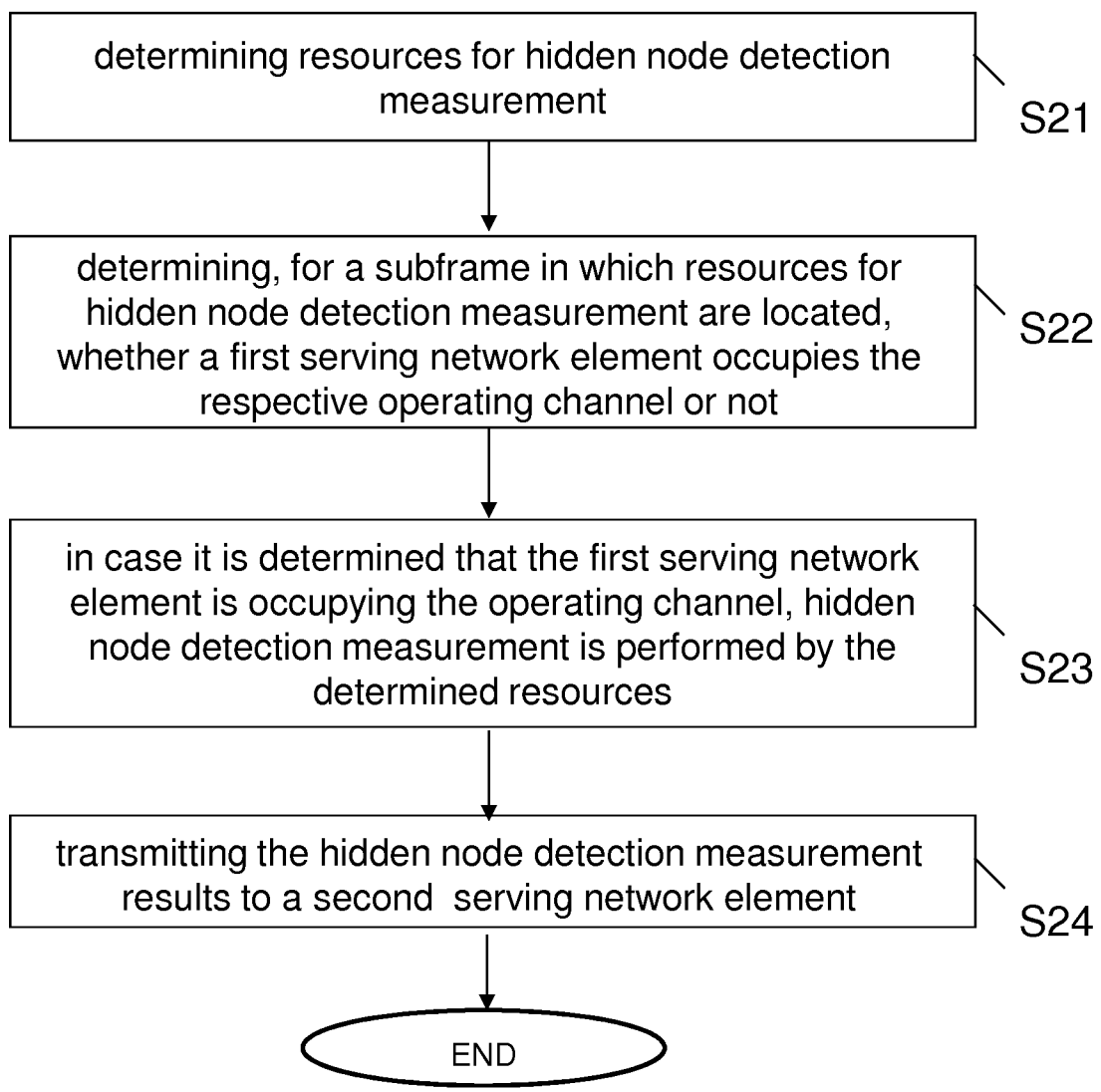
FIG. 2 illustrates a method performed in a user equipment according to certain embodiments of the invention.

FIG. 2 shows a method according to some example versions of the disclosure, which may be performed by a user equipment e.g. under LTE environment.

In Step S21, resources for hidden node detection measurement are determined.

Then, in Step S22, it is determined for a subframe in which resources for hidden node detection measurement are located, whether a first serving network element occupies the respective operating channel or not.

Further, in Step S23, in case it is determined that the first serving network element is occupying the operating channel, hidden node detection measurement is performed in the determined resources.

Still further, in Step 24, the hidden node detection measurement results are transmitted to a second serving network element Thereby, the first serving cell may be on an unlicensed carrier, and the second serving cell may be on a licensed carrier, wherein the first and the second cell are aggregated using carrier aggregation, and the first cell may be a secondary cell, and the second cell may be a primary cell.

Figure 3:
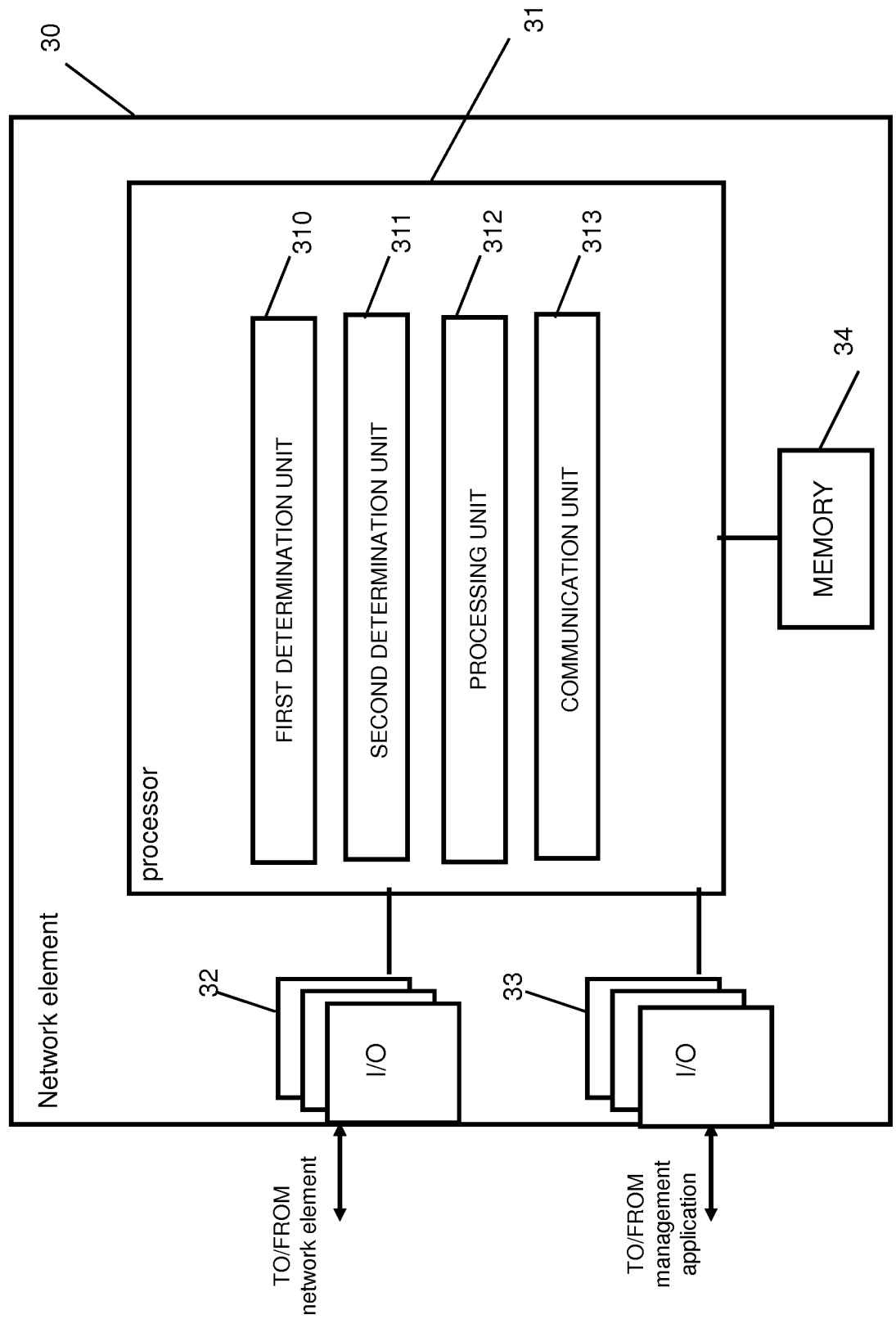
FIG. 3 depicts a general structure of an apparatus comprised in a user equipment according to certain embodiments of the invention.

In FIG. 3, a diagram illustrating a configuration of an element comprised in a network element, such as a user equipment operable in LTE LAA, according to some example versions of the disclosure is shown, which is configured to implement improved hidden node detection for LTE LAA described in connection with some of the example versions of the disclosure. The embodiment may be carried out in or by the network element (e.g. UE). It is to be noted that the network element may comprise elements or functions, such as a chipset, a chip, a module etc., which can also be part of a network element or attached as a separate element to a network element, or the like. It should be understood that each block and any combination thereof may be implemented by various means or their combinations, such as hardware, software, firmware, one or more processors and/or circuitry.

The network element 30 shown in FIG. 3 may comprise a processing function, control unit or processor 31, such as a CPU or the like, which is suitable for executing instructions given by programs or the like related to the network element control procedure.

The processor 31 is configured to execute processing related to the above described hidden node detection for LTE LAA. In particular, the processor 31 comprises a sub-portion 310 as a first determination unit configured to determine resources for hidden node detection measurement. The portion 310 may be configured to perform processing according to S21 of FIG. 2. Furthermore, the processor 31 comprises a sub-portion 311 usable as a second determination unit configured to determine, for a subframe in which resources for hidden node detection measurement are located, whether a first serving network element occupies the respective operating channel or not. The portion 311 may be configured to perform processing according to S22 of FIG. 2. Furthermore, the processor 31 comprises a sub-portion 312 usable as a processing unit configured to perform, hidden node detection measurement by the determined resources, in case it is determined that the first serving network element is occupying the operating channel. The portion 312 may be configured to perform processing according to S23 of FIG. 2. Furthermore, the processor 31 comprises a sub-portion 313 usable as a communication unit configured to cause transmission of the hidden node detection measurement results to a second serving network element. The portion 313 may be configured to perform processing according to S24 of FIG. 2.

Reference signs 32 and 33 denote transceiver or input/output (I/O) units (interfaces) connected to the processor 31. The I/O units 32 may be used for communicating with the network element. The I/O units 33 may be used for communicating with a management application. Reference sign 34 denotes a memory usable, for example, for storing data and programs to be executed by the processor 31 and/or as a working storage of the processor 31.

Figure 4:
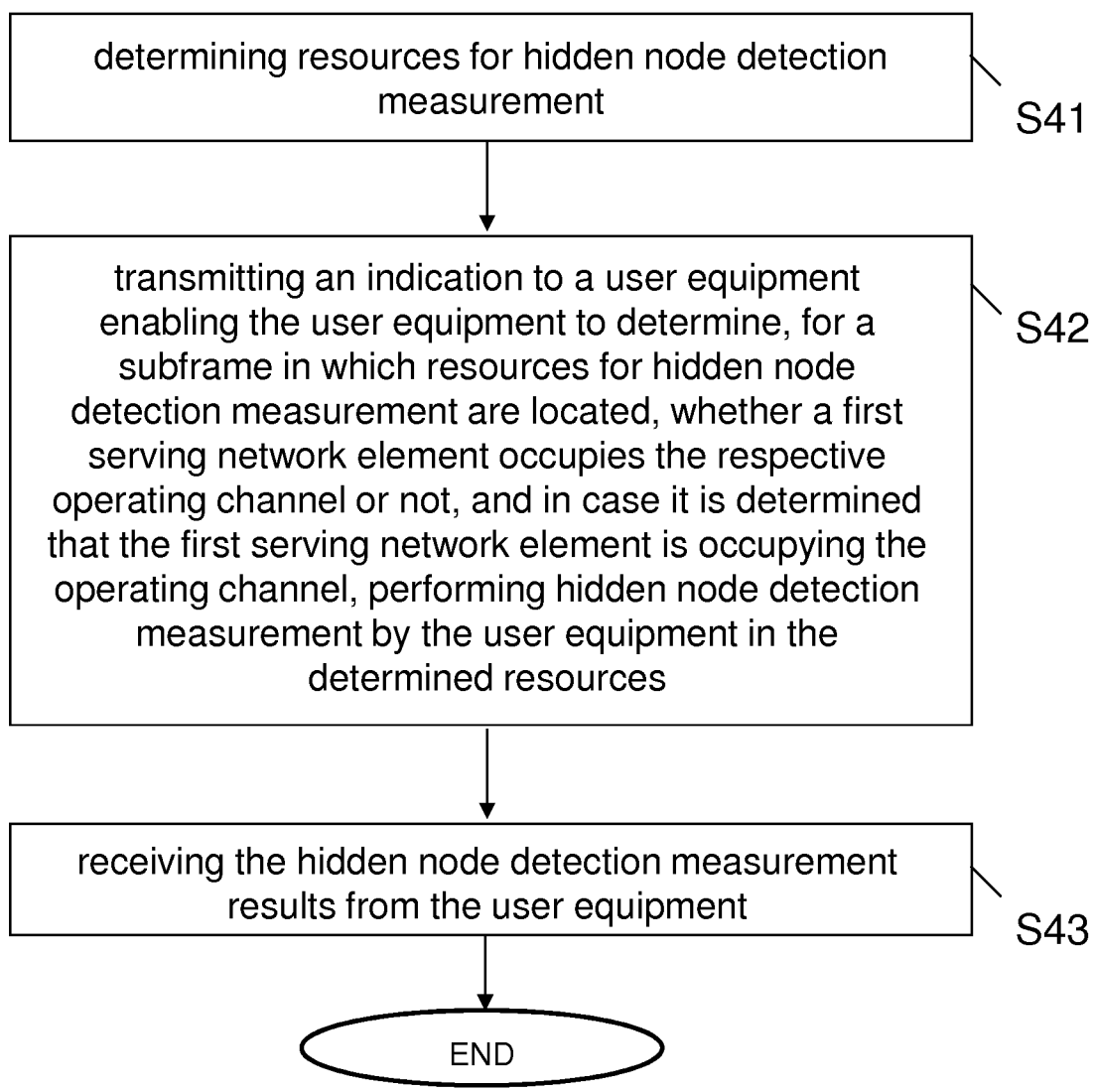
FIG. 4 illustrates a method performed in a base station or network element according to certain embodiments of the invention.

FIG. 4 shows a method according to some example versions of the disclosure, which may be performed by base station or network element e.g. under LTE environment.

In Step S41, resources for hidden node detection measurement are determined.

Then, in Step S42, an indication is transmitted to a user equipment enabling the user equipment to determine, for a subframe in which resources for hidden node detection measurement are located, whether a first serving network element occupies the respective operating channel or not, and in case it is determined that the first serving network element is occupying the operating channel, performing hidden node detection measurement by the user equipment in the determined resources.

Further, in Step S43, the hidden node detection measurement results are received from the user equipment.

Thereby, information about the determined resources may further be transmitted by the first base station to a second base station. Likewise, information about the determined resources may be transmitted by the base station or the network element to the user equipment.

Further, the indication that the first serving network element occupies the operating channel may be that a given subframe or a set of subframes is used for downlink transmission in the licensed assisted access. Still further, the indication of first serving network element's channel occupancy may be downlink scheduling, wherein transmission of a downlink control information on a physical downlink control channel indicates that the first serving network element is occupying the operating channel.

Figure 5:
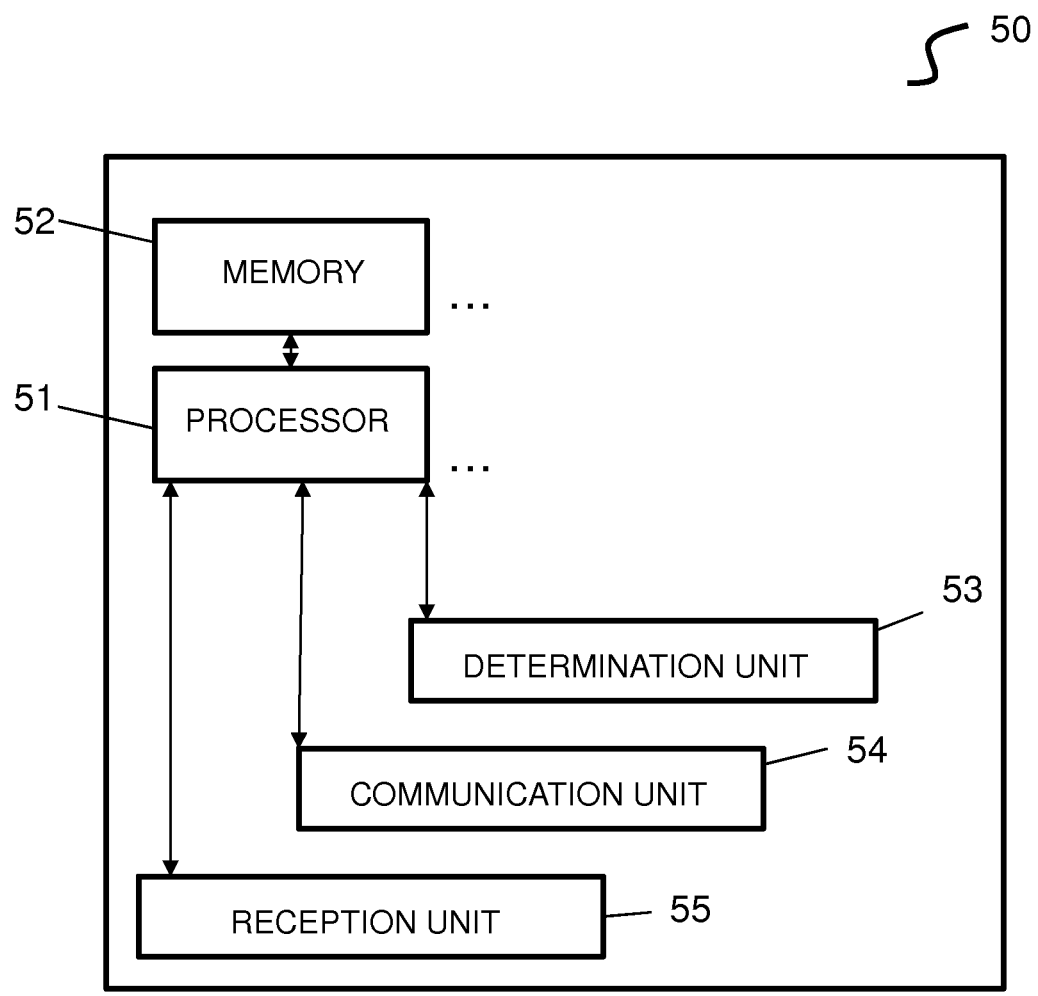
FIG. 5 depicts a general structure of an apparatus comprised in a base station or network element according to certain embodiments of the invention.

In FIG. 5, a diagram illustrating a configuration of an element comprised in a base station or network element according to some example versions of the disclosure is shown, which is configured to implement improved hidden node detection for LTE LAA described in connection with some of the example versions of the disclosure.

The configuration comprises at least one processor 51, and at least one memory 52 for storing instructions to be executed by the processor 51, wherein the at least one memory 52 and the instructions are configured to, with the at least one processor 51, cause the apparatus at least to perform the steps according to FIG. 4. Thereby, a determination unit 53 for determining resources for hidden node detection measurement, a communication unit 54 for transmitting an indication to a user equipment enabling the user equipment to determine, for a subframe in which resources for hidden node detection measurement are located, whether a first serving network element occupies the respective operating channel or not, and in case it is determined that the first serving network element is occupying the operating channel, performing hidden node detection measurement by the user equipment in the determined resources, and a reception unit 55 for receiving the hidden node detection measurement results from the user equipment are provided in the configuration.

As mentioned in step 2 of the above-indicated exemplary versions of the present invention, the UE should perform measurements only in DL subframes where the serving eNB is actively transmitting. In that way the UE can assume that the eNB has evaluated the channel to be free during LBT procedure, hence non-hidden nodes are not transmitting (except possibly LTE LAA nodes synchronized with the serving eNodeB), and the UE should end up measuring interference only from the hidden nodes.

As examples how an UE detects that serving eNB is performing a DL transmission at least two options are provided. On the one hand, the UE of interest is itself scheduled in given subframe and will therefore find a scheduling assignment Downlink Control Information DCI in Physical Downlink Control Channel PDCCH on a given unlicensed channel. On the other hand, if a given UE is not scheduled, the eNB may signal its DL activity explicitly in PDCCH of either the unlicensed serving cell, or the PCell on the licensed carrier. Such DCI may occupy common search space so that all associated UEs are able to detect and decode it.

Secondly, it is to be specified how the UE will perform the measurement. There are basically three options as non-limiting exemplary versions of the present invention: (1) RRM measurements, (2) CSI-IM measurements and (3) LBT type of measurements.

Thereby, CSI-IM measurements, option (2), may be a preferable option. RRM measurements are heavier on signaling than CSI measurements and they are primarily used for measuring other cells, not the serving cell. While RRM measurements may be performed also in other channels (via measurement gaps), there is no connection in other channels to eNB's LBT result, and hidden nodes cannot thus be detected. The last option (3) would require definition of a new procedure and is therefore less preferred.

UE measurement based on CSI-IM is also preferable because neighbor eNBs may coordinate the corresponding ZP CSI-RS to occupy the same resource elements. That way, when UE performs CSI-IM measurement in subframe where serving eNB has DL, there will be no interference from the own network (or cluster) present on the measured resource elements.

Additionally, if ZP CSI-RS are located in the same subframe as the DL transmission started (a preferred embodiment), a time difference between eNB and UE measurement will be e.g. below 1 ms. This may be assumed to be already close enough to evaluate potential presence of a hidden node, because low delay decreases a chance that WLAN nodes change their state from active to silent or back. While it is true that the state of the nodes could still change within the delay, hidden node detection measurement may be repeated or filtered in time domain in order to build a more accurate hypothesis.

CSI-IM resource elements of a given CSI process are wideband (i.e. appear on all PRB pairs), but do not cover every subcarrier. For comparing the interference measurement with a CCA threshold, the measurement must be scaled appropriately. The applied threshold may either be a fixed value provided e.g. from European Telecommunications Standards Institute ETSI requirements. such as e.g. −73 dBm/MHz with 23 dBm transmission power and 0 dBi antenna, or it may be a configurable value signaled by RRM.

Thirdly, the UE must report the result of measurement back to the eNB. A preferable way according to exemplary versions of the present invention is to create a new 1 bit information in CSI report, signaling whether the threshold has been surpassed or not. The additional 1-bit field may not need to be present in all CSI reports, if the main point is to just identify whether a hidden node exists or not, rather than try to track constantly if the hidden node is transmitting or not. In such case, the periodicity of HNDM reporting could be configured separately from that of normal CSI reports. Another way is use RRM measurement reporting framework. However, RRM measurement reports are larger, because they contain MAC/PDCP/RLC headers and so on.

Figure 6:
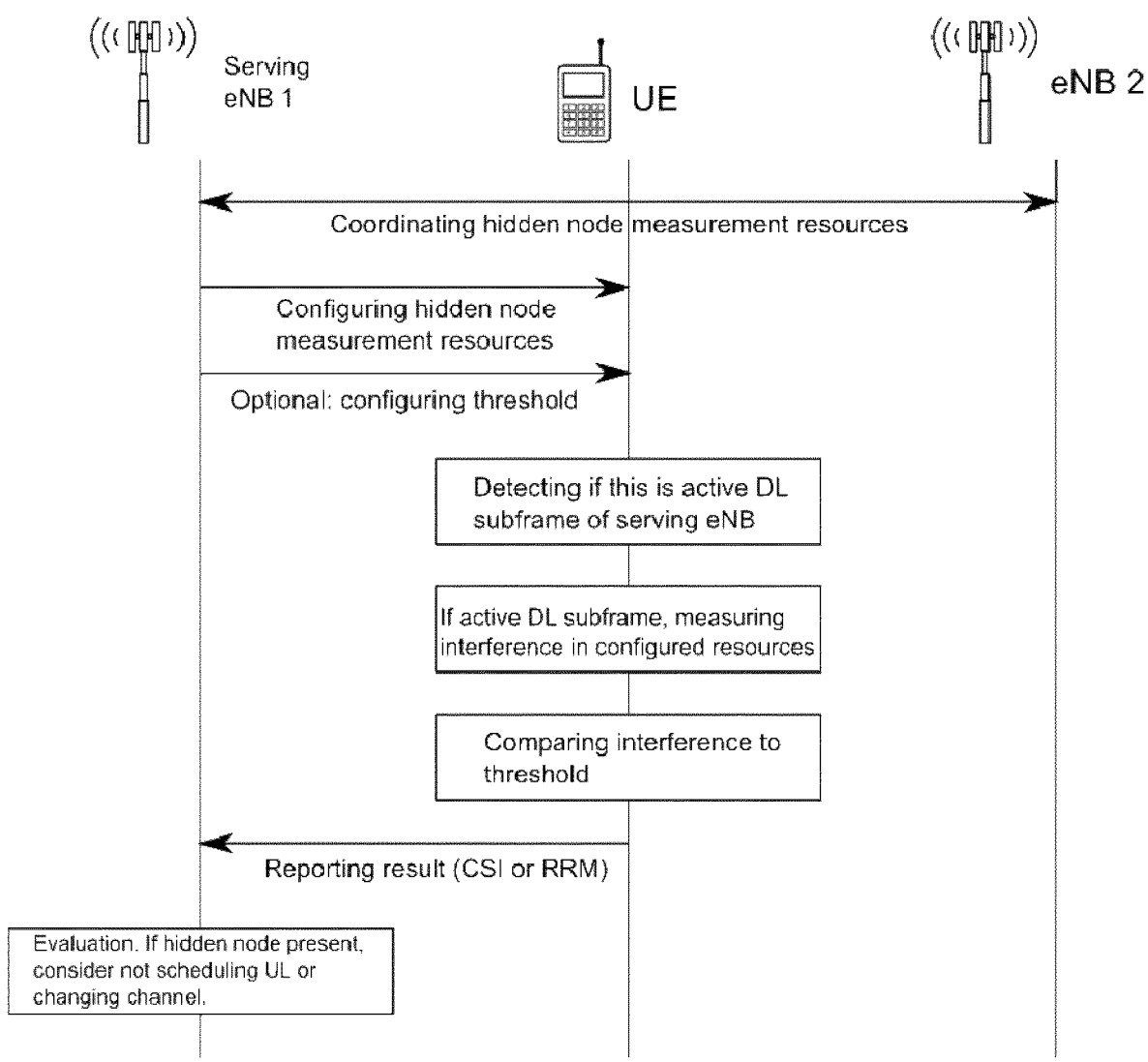
FIG. 6 shows a signaling and action flow of the procedure for hidden node detection and reporting according to certain embodiments of the invention.

The signaling and action flow according to exemplary versions of the invention is illustrated in FIG. 6.

The hidden node measurement resources are coordinated between a Serving eNB 1, an UE and an eNB 2.

The Serving eNB 1 transmits a signaling to the UE, indicating configuring hidden node measurement resources. Optional, a request for configuring a threshold is transmitted to the UE.

Then, the UE detects if this is an active DL subframe of the serving eNB. If an active DL subframe is present, measuring interference in configured resources is performed by the UE. Subsequently, the interference is compared to the threshold by the UE.

Finally, the UE transmits a reporting result (CSI or RRM) to the Serving eNB 1, which evaluates if the hidden node is present or not. Then, scheduling UL or changing channel is considered by the Serving eNB 1.

Even though the examples above have been described from the viewpoint of LAA and operation utilizing unlicensed spectrum, features as described herein are equally valid for other co-existence scenarios utilizing also licensed spectrum. For example, Licensed Shared Access LSA is an example of such a scenario. LSA is a spectrum sharing concept enabling access to spectrum that is identified for International Mobile Telecommunications IMT, but not cleared for IMT deployment. Co-primary sharing is another example. Co-primary sharing refers to spectrum sharing where several primary users (operators) share the spectrum dynamically or semi-statically. This may be used for small cells at 3.5 GHz for example. Spectrum sharing between operators will happen if regulators force it and/or operators need it. Thus, features as described herein are also applicable to LSA and Co-primary sharing.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It should also be understood that the above described example embodiments of the invention are not to be viewed in a limiting sense. Rather, there are several variations and modifications which may be made without departing from the scope of the present invention as defined in the appended claims.

The following meanings for the abbreviations used in this specification apply:
3GPP 3rd Generation Partnership Project
CCA clear channel assessment
CSI channel state information
CSI-IM CSI interference measurement
CSI-RS CSI reference symbols
DL Downlink
eNB evolved Node B (LTE Base Station)
HNDM Hidden Node Detection Measurement
LAA licensed assisted access
LBT listen before talk
LTE Long Term Evolution
PCell Primary Cell
PRB Physical Resource Block
RRM radio resource management
SCell Secondary Cell
UE Use Equipment, i.e. mobile terminal
UL Uplink
WLAN Wireless Local Area Network, WiFi
ZP CSI-RS zero power CSI-RS

What is claimed is:
1. A method, performed by a user equipment, for detecting a hidden node in licensed assisted access, comprising:
determining resources for hidden node detection measurement;

determining, for a subframe in which resources for the hidden node detection measurement are located, whether a first serving network element occupies a respective operating channel or not, wherein the first serving network element's channel occupancy is determined based on downlink scheduling, wherein reception of a downlink control information on a physical downlink control channel indicates that the serving network element is occupying the operating channel;

in case it is determined that the first serving network element is occupying the operating channel:

performing the hidden node detection measurement of a hidden node that is not visible to the first serving network element, in the determined resources; and transmitting the hidden node detection measurement results to a second serving network element, wherein the hidden node detection measurement results comprise information indicating whether the hidden node detection measurement of the hidden node exceeds a given threshold.

2. The method according to claim 1, wherein the first serving network element corresponds to a first cell on an unlicensed carrier, and the second serving network element corresponds to a second cell on a licensed carrier.

3. The method according to claim 1, wherein, when the first serving network element is not occupying the channel, hidden node measurements are not performed or reported.

4. A method, performed by a base station or a network element, for detecting a hidden node in licensed assisted access, comprising:

configuring resources for hidden node detection measurement;

transmitting an indication to a user equipment enabling the user equipment to determine, for a subframe in which resources for the hidden node detection measurement are located, whether a first serving network element occupies a respective operating channel or not, and in case it is determined that the first serving network element is occupying the operating channel, to perform the hidden node detection measurement of a hidden node that is not visible to the first serving network element in the configured resources, wherein the indication of first serving network element's channel occupancy is downlink scheduling, wherein transmission of a downlink control information on a physical downlink control channel indicates that the first serving network element is occupying the operating channel; and receiving the hidden node detection measurement results from the user equipment, wherein the hidden node detection measurement results comprise information indicating whether the hidden node detection measurement of the hidden node exceeds a given threshold.

5. The method according to claim 4, wherein the indication that the first serving network element occupies the operating channel is that a given subframe or a set of subframes is used for downlink transmission in the licensed assisted access.

6. An apparatus for use in a user equipment, for detecting a hidden node in licensed assisted access, comprising:

at least one processor, and at least one memory for storing instructions to be executed by the processor, wherein the at least one memory and the instructions are configured to, with the at least one processor, cause the apparatus at least to:

determine resources for hidden node detection measurement;

determine, for a subframe in which resources for the hidden node detection measurement are located, whether a first serving network element occupies a respective operating channel or not, wherein the first serving network element's channel occupancy is determined based on downlink scheduling, wherein reception of a downlink control information on a physical downlink control channel indicates that the serving network element is occupying the operating channel;

in case it is determined that the first serving network element is occupying the operating channel:

perform the hidden node detection measurement of a hidden node that is not visible to the first serving network element, in the determined resources; and transmit the hidden node detection measurement results to a second serving network element, wherein the hidden node detection measurement results comprise information indicating whether the hidden node detection measurement of the hidden node exceeds a given threshold.

7. The apparatus according to claim 6, wherein the first serving network element corresponds to a first cell on an unlicensed carrier, and the second serving network element corresponds to a second cell on a licensed carrier.

8. The apparatus according to claim 7, wherein the first and the second network element are aggregated using carrier aggregation, and the first cell is a secondary cell, and the second cell is a primary cell.

9. The apparatus according to claim 6, wherein, when the first serving network element is not occupying the channel, hidden node measurements are not performed or reported.

10. The apparatus according to claim 6, wherein the resources are at least one of time and frequency.

11. The apparatus according to claim 6, wherein the resources are channel state information interference measurement resources and are configured via radio resource control signaling.

12. The apparatus according to claim 6, wherein the hidden node detection measurement result provides information indicating the observed interference or channel quality level quantized to preset number of bits.

13. The apparatus according to claim 6, wherein the hidden node detection measurement result is periodically reported by physical uplink control channel or physical uplink shared channel resources configured by the second serving network element, or is embedded into periodic or aperiodic channel state information reports.

14. An apparatus for use in a base station or a network element, for detecting a hidden node in licensed assisted access, comprising:

at least one processor, and at least one memory for storing instructions to be executed by the processor, wherein the at least one memory and the instructions are configured to, with the at least one processor, cause the apparatus at least to:

configure resources for hidden node detection measurement;

transmit an indication to a user equipment enabling the user equipment to determine, for a subframe in which resources for the hidden node detection measurement are located, whether a first serving network element occupies a respective operating channel or not, and in case it is determined that the first serving network element is occupying the operating channel, to perform the hidden node detection measurement of a hidden node that is not visible to the first serving network element in the configured resources, wherein the indication of first serving network element's channel occupancy is downlink scheduling, wherein transmission of a downlink control information on a physical downlink control channel indicates that the first serving network element is occupying the operating channel; and receive the hidden node detection measurement results from the user equipment, wherein the hidden node detection measurement results comprise information indicating whether the hidden node detection measurement of the hidden node exceeds a given threshold.

15. The apparatus according to claim 14, further comprising transmitting, by the base station or the network element, information about the configured resources to the said user equipment.

16. The apparatus according to claim 14, wherein the indication that the first serving network element occupies the operating channel is that a given subframe or a set of subframes is used for downlink transmission in the licensed assisted access.

* * * * *